US007565268B2

(12) United States Patent
Smith et al.

(10) Patent No.: US 7,565,268 B2
(45) Date of Patent: Jul. 21, 2009

(54) SYSTEMS AND METHODS FOR REPORTING PERFORMANCE METRICS

(75) Inventors: Chad W. Smith, Jamestown, NC (US); John Chung, London (GB)

(73) Assignee: American Express Travel Related Services Company, Inc., New York, NY (US)

( * ) Notice: Subject to any disclaimer, the term of this patent is extended or adjusted under 35 U.S.C. 154(b) by 214 days.

(21) Appl. No.: 11/617,334

(22) Filed: Dec. 28, 2006

(65) Prior Publication Data

US 2007/0225942 A1    Sep. 27, 2007

Related U.S. Application Data

(60) Provisional application No. 60/755,499, filed on Dec. 30, 2005.

(51) Int. Cl.
*G06F 11/30* (2006.01)

(52) U.S. Cl. ................................................. 702/182
(58) Field of Classification Search ................. 702/182
See application file for complete search history.

(56) References Cited

U.S. PATENT DOCUMENTS

| 6,675,128 B1 * | 1/2004 | Hellerstein .................. 702/182 |
| 7,225,103 B2 * | 5/2007 | Beresniewicz et al. ...... 702/179 |
| 2008/0195431 A1 * | 8/2008 | Abe et al. ...................... 705/7 |

* cited by examiner

*Primary Examiner*—Bryan Bui
*Assistant Examiner*—Aditya Bhat
(74) *Attorney, Agent, or Firm*—Fitzpatrick, Cella, Harper & Scinto

(57) ABSTRACT

A performance evaluation system that evaluates performance within an entity. The system allows users to assess their performance relative to predetermined goals, progress points and performance indicators or metrics while also providing users with the ability to quickly and effectively identify driving forces for performance.

36 Claims, 14 Drawing Sheets

| METRIC | UPDATED THROUGH | GRAPH | PREVIOUS MONTH CQ | MTD CQ | MTD PERCENTILE | RTD CQ | RTD PERCENTILE | RTD WEIGHT |
|---|---|---|---|---|---|---|---|---|
| METRIC 1 | 4/30/2004 | ⦿ | 94.8 | 98.2 | 30.4% | 95.9 | 29% | 45% |
| METRIC 1, SUBCATEGORY 1 | 4/30/2004 | ○ | 102.2 | 100.9 | 35.1% | 101.8 | 30.2% | 28.9% |
| METRIC 1, SUBCATEGORY 2 | 4/30/2004 | ○ | 82.7 | 92.8 | 34.4% | 85.7 | 41.4% | 16.1% |
| METRIC 2 | 4/30/2004 | ○ | – | – | – | – | – | 35% |
| METRIC 3 | 4/30/2004 | ○ | 84.6 | 105.4 | 8.9% | 90 | 55.6% | 13.6% |
| METRIC n | 4/30/2004 | ○ | – | 97.1 | 42.6% | 97.1 | 42.6% | 6.4% |

FIG. 8C

YOUR NAME HERE        808a    808b              808c
                       27.78 (55 OF 198) AS OF 2/25/2005

FIG. 8F

SYSTEMS AND METHODS FOR REPORTING PERFORMANCE METRICS

CROSS REFERENCE TO RELATED APPLICATIONS

This utility application claims priority to, and the benefit of, U.S. Provisional Application No. 60/755,499, filed Dec. 30, 2005, which is hereby incorporated herein by reference in its entirety.

TECHNICAL FIELD OF THE PRESENT INVENTION

The present invention relates generally to a performance evaluation and review system. More specifically, the present invention relates to a performance evaluation and review system that utilizes performance indicators or metrics and other performance measuring or comparison tools to illustrate an employee's performance over any given period.

BACKGROUND OF THE PRESENT INVENTION

Performance results and evaluations for individuals are usually fragmented and are scattered among many reports. An individual interested in assessing the performance of an individual or group of individuals would have to scour through numerous reports or screens—a time-consuming and sometimes frustrating process. Accordingly, there is a need to ensure that the performance evaluation and review processes are more succinct and easy to use. There also is a need to ease access to performance information or data by employees/individuals and their supervisors or managers. Given the foregoing, what is needed is a system, method and computer program product for reporting performance metrics.

SUMMARY OF THE PRESENT INVENTION

The present invention meets the above-identified needs by providing a system, method and computer program product for reporting performance metrics. In one aspect of the invention, a system, method and computer readable medium are provided for evaluating performance, where a period to evaluate for the performance is defined, and at least one performance indicator is defined. The definition of at least one group to be evaluated is defined, where each group has at least one member. A performance result for at least one performance indicator for the at least one member is determined and the member is rated. The percentile of the performance result is determined and one or more reports are generated.

Further features and advantages of the present invention as well as the structure and operation of various embodiments of the present invention are described in detail below with reference to the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures.

FIG. 8C shows the data section of the overall results or reports display of FIG. 8A in further detail in accordance with yet a further embodiment of the present invention.

FIG. 8F shows the summary section of the overall results or reports display of FIG. 8A in further detail in accordance with yet another embodiment of the present invention.

DETAILED DESCRIPTION

Figure 1:
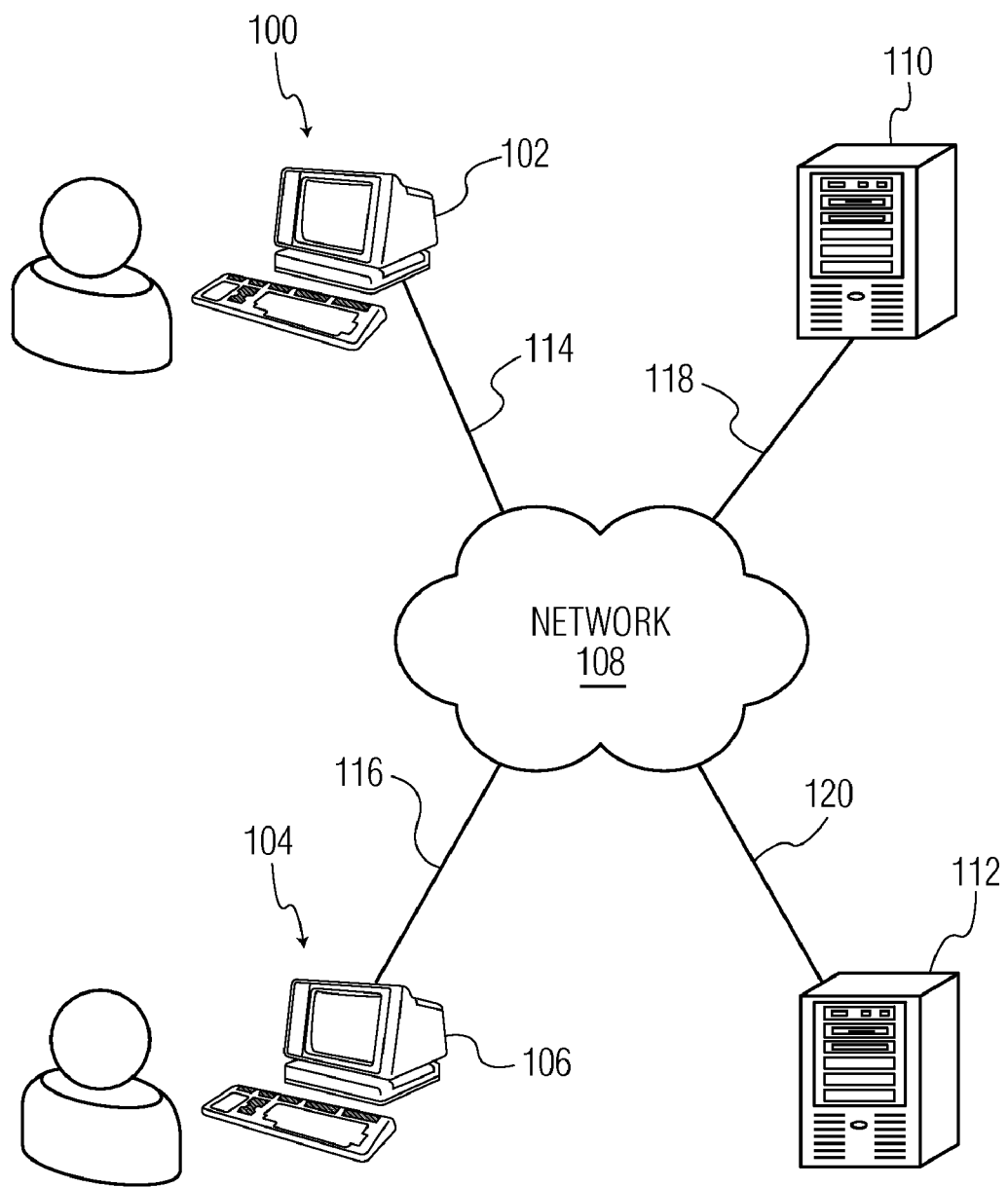
FIG. 1 is a system diagram in accordance with an exemplary embodiment of the present invention.

The present invention is now described in more detail herein in terms of exemplary systems, methods and program products for reporting performance metrics over a network. This is for convenience only and is not intended to limit the application of the present invention. In fact, after reading the following description, it will be apparent to one skilled in the relevant art(s) how to implement the following invention in alternate embodiments (e.g., one of or a combination of network data traffic protocols such as: TCP/IP; IPX/SPX; Bluetooth; AppleTalk; or any present or future data traffic protocols currently known or later devised).

Generally, the present invention is directed to a system, method and computer program product for determining and displaying performance indicators or metrics for an individual's performance within a given period. In one aspect of the present invention, an individual's overall ranking within a particular group in an entity may be quickly determined and tracked over time. In addition, concise information about an individual's performance is provided and individuals' real-time performance relative to their peers can be reviewed in a timely manner.

Drill paths provide access to details for diagnostics, self-learning and coaching opportunities, where required by the performance indicators. Performance statistics are provided along with trending performance information. Users can more readily understand the factors driving or affecting an employee's/individual's performance by accessing detailed analyses provided by the present invention.

A quick interface with performance "snapshots" provides users with detailed analyses or evaluation of their performance over different periods of time. As such, a user's performance can be analyzed on a periodic basis thus generating information about the user's "month to date" (MTD), "review to date" (RTD), or "year to date" (YTD), performances on the user's performance indicators or metrics, where MTD is from the beginning of the month to the present date of review, RTD is from the beginning of the review period to the present date of review, and YTD is from the beginning of the year to the present date of review. Performance indicators or metrics are measures of an individual's performance. These indicators or measures are subsequently rolled up into one result, which is then displayed in a variety of ways. Thus one performance value or measure can be compiled from a plurality of other performance measures or indicators.

Individuals and their team leaders, managers or supervisors are provided with the ability to assess and evaluate the individual's or team leader's performance in one view. The time taken to perform a complete review of an individual's performance is reduced since users are enabled to see how they are performing thus greatly enhancing their ability to spot trends, coaching opportunities and ways to improve their performance.

Performance coaching delivered by leaders or managers is also improved. For example, a particular metric or performance indicator may determine how well an individual treats a customer and how the individual conveys correct information to the same customer. If at any time the individual receives a negative rating (which may be recorded or noted by the metric) by the customer, the individual's manager or supervisor is notified when the individual's rating is in violation of predetermined compliance benchmarks. The supervisor may also discover and view the individual's negative rating when the supervisor logs on to the system. Following the supervisor's review, he/she then provides corrective action. The individual may then be coached for their poor performance.

The present invention may be implemented by hardware and/or software configured to perform the tasks or functions herein. The information generated may be provided numerically, graphically or textually and may be color coded when displayed. FIG. 1 shows a system diagram in accordance with an exemplary embodiment of the present invention. Individuals and their team leaders, managers or supervisors may log on to the system via terminals 100 and 104. In an alternate embodiment, both parties can log on at the same computer/terminal or at any other computer/terminal linked to/with network 108. The computer/terminals are linked together with web server 110 and database server 112 by way of network 108. The links are accomplished by data communication paths 114, 116, 118 and 120. The data communication paths may be implemented by any system for exchanging data, such as, for example: an intranet; the internet; an extranet; WAN; LAN; a wireless communications network; or the like. Network 108 also may be implemented by use of one or a combination of a variety of network data protocols such as, for example: Bluetooth; Appletalk; TCP/IP; IPX/SPX; or any present or future data traffic protocols currently known or later devised.

In an exemplary embodiment, web server 110 and database server 112 each may be configured to receive data on each individual over network 108. Web server 110 and database server 112 may also each comprise of the following components: CPU (processor), RAM and ROM, memory device or data storage, etc. Each component may be communicably connected with the processor. The processors are configured to process performance data received for individuals. In another embodiment, web server 110 and database server 112 may be configured to use resident computer readable media, software or instruction code stored in the processor to make certain calculations, comparisons determinations, generate certain values, etc., as required in the present invention and as used in ranking individuals as further discussed below. In a further embodiment, web server 110 and database server 112 may be configured to receive and store certain predetermined benchmark values used in assessing and ranking individuals' performance. These values may be manually entered into the servers or may be generated as a result of the resident instruction code.

The processor component of web server 110 is configured to display reports on performance data for an individual as seen in FIGS. 8A-8F on display devices 102 and 106 or any other display device linked to network 108. Database server 112 is configured to monitor an individual's performance data over a period of time. The individual's performance data is stored in the storage component of database server 112. This stored data may be later used in assessing the individual's performance.

Figure 2:
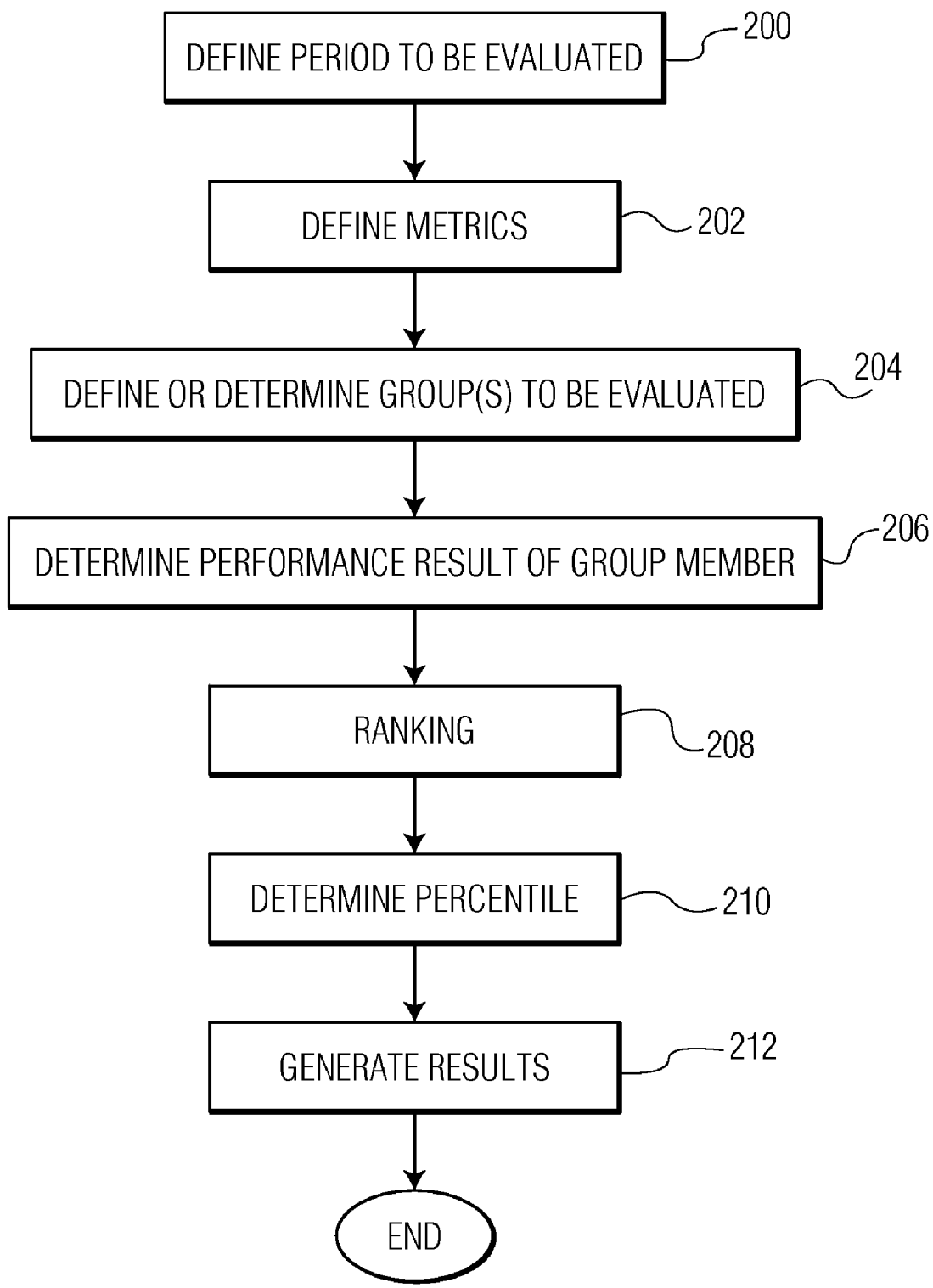
FIG. 2 is a flow chart depicting a process for generating performance reports of individuals for a given performance period in accordance with an embodiment of the present invention.

FIG. 2 is a flow chart depicting a process for generating performance reports of individuals for a given performance period. Individuals can be personnel, employees, associates, members of a group and the like. In addition, individuals need not be individual persons but instead can be individual entities. Accordingly, the present invention can be used to provide results for both one or more persons or one or more entities, or a combination of both.

In step 200, the performance period to be evaluated is defined by an authorized user. The authorized user, who may be a team leader, manager or supervisor, may log on to any of computer/terminals 100 or 104 or any other computer/terminal linked to network 108. In an alternate embodiment, the performance period may be set weekly for an individual's performance and may be set by an automatic scheduler preset for certain periods. The period may also be set manually by the authorized user. In step 202, the metrics to be measured are defined by the business entity in terms an individual's responsibility or responsibilities. The metrics (which may be expressed in numerical values) are performance indicators, which are measures of an individual's performance, examples of which may include an individual's average handling time on a call, the percentage of dollars collected or calls handled by an individual per hour. Individuals are reviewed based on each metric. Metric values are utilized in providing an overall review and ranking of the individual. The results of the review and ranking are then displayed on a computer screen or provided in other forms, such as in a data file. The results can be provided in a variety of ways including, trending graphs, "speedometer" graphs, etc. The displaying, printing and formatting of the results are described in more detail below with respect to FIGS. 3, 4 and 8A-8F.

The particular metrics used to generate reports can be predefined. However, all the predefined metrics need not be utilized for each report. In one embodiment, all possible metrics for an individual are identified and defined while in yet another embodiment, select metrics are identified and defined. This can be accomplished, for example, by having an authorized user identify which metrics should be measured. Alternatively, for example, the correlation between a particular individual and a set of metrics may be conducted either by an authorized user or by database server 112. Referring again to FIG. 2, in step 204, a group or groups of individuals to be evaluated are determined by a team leader or reviewing supervisor. Next, in step 206, the performance result for each selected group member is determined and retrieved from database server 112. The performance result is the measure of an individual's accomplishments in a period. For example, in a credit collection department or group, an individual's performance result may be the total amount of money collected within a given period. The individual's position is then ranked against members with similar or the same responsibilities/functions in the group based on their performance, as shown in step 208. Next, the individual's percentile is calculated by database server 112 in step 210. The results are then generated and compiled by database server 112, as shown in step 212. The results obtained based on the aforementioned definitions and calculations are described in more detail below.

Figure 3:
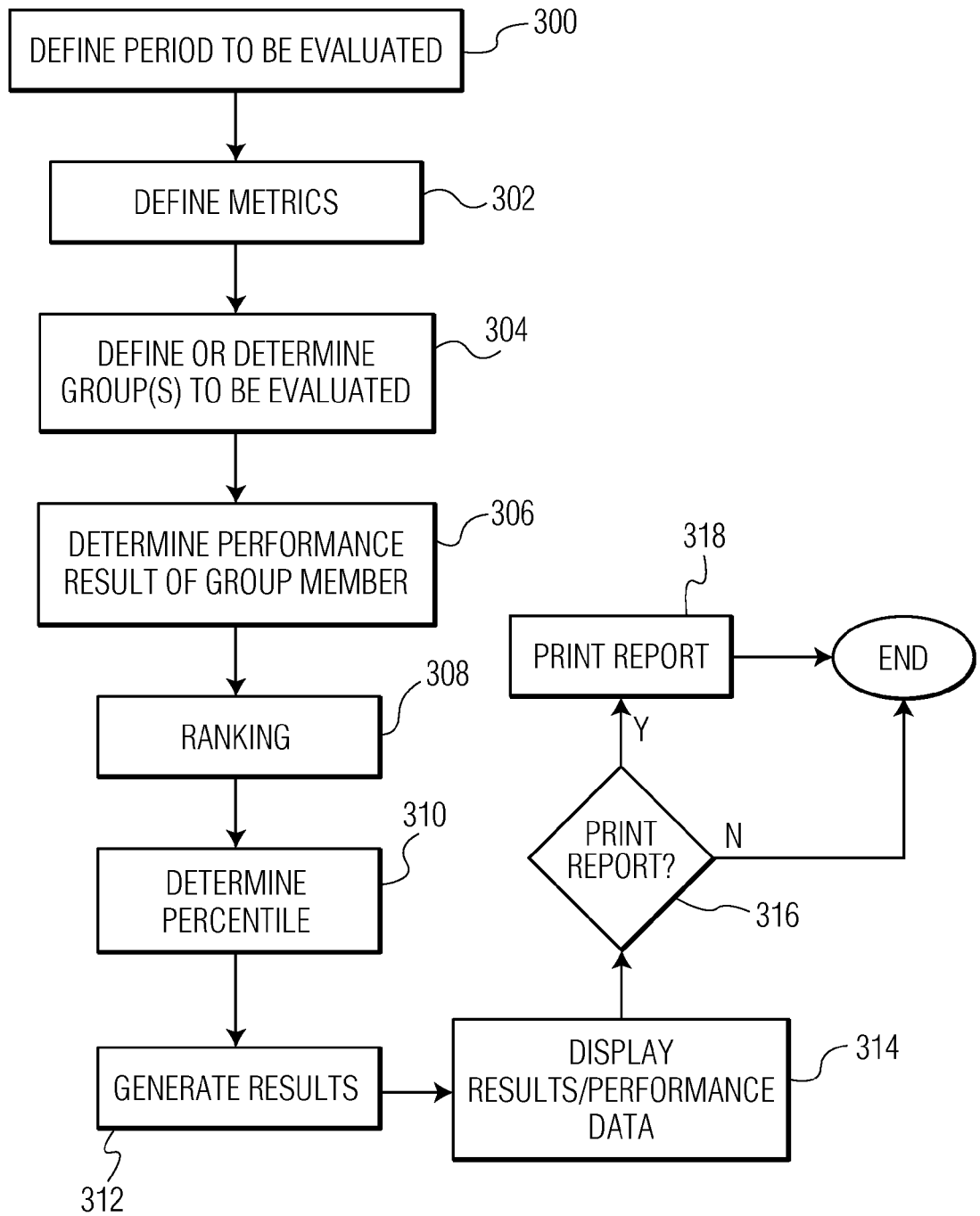
FIG. 3 is a flow chart with display and printing capabilities in accordance with another embodiment of the present invention.

FIG. 3 is another flow chart highlighting another embodiment of the present invention. While steps 300-312 are similar to steps 200-212 above in FIG. 2, this embodiment has the additional steps (314-318) of displaying and optionally printing the generated results/reports. The results/reports may be displayed on a computer monitor, screen, television screen, personal digital assistant or the like. The display is made possible by web server 110 which utilizes resident instruction code to display the reports in a variety of ways. The display may be viewed by any one of display devices 102 and 106 or any other display device linked to the network 108.

Figure 4:
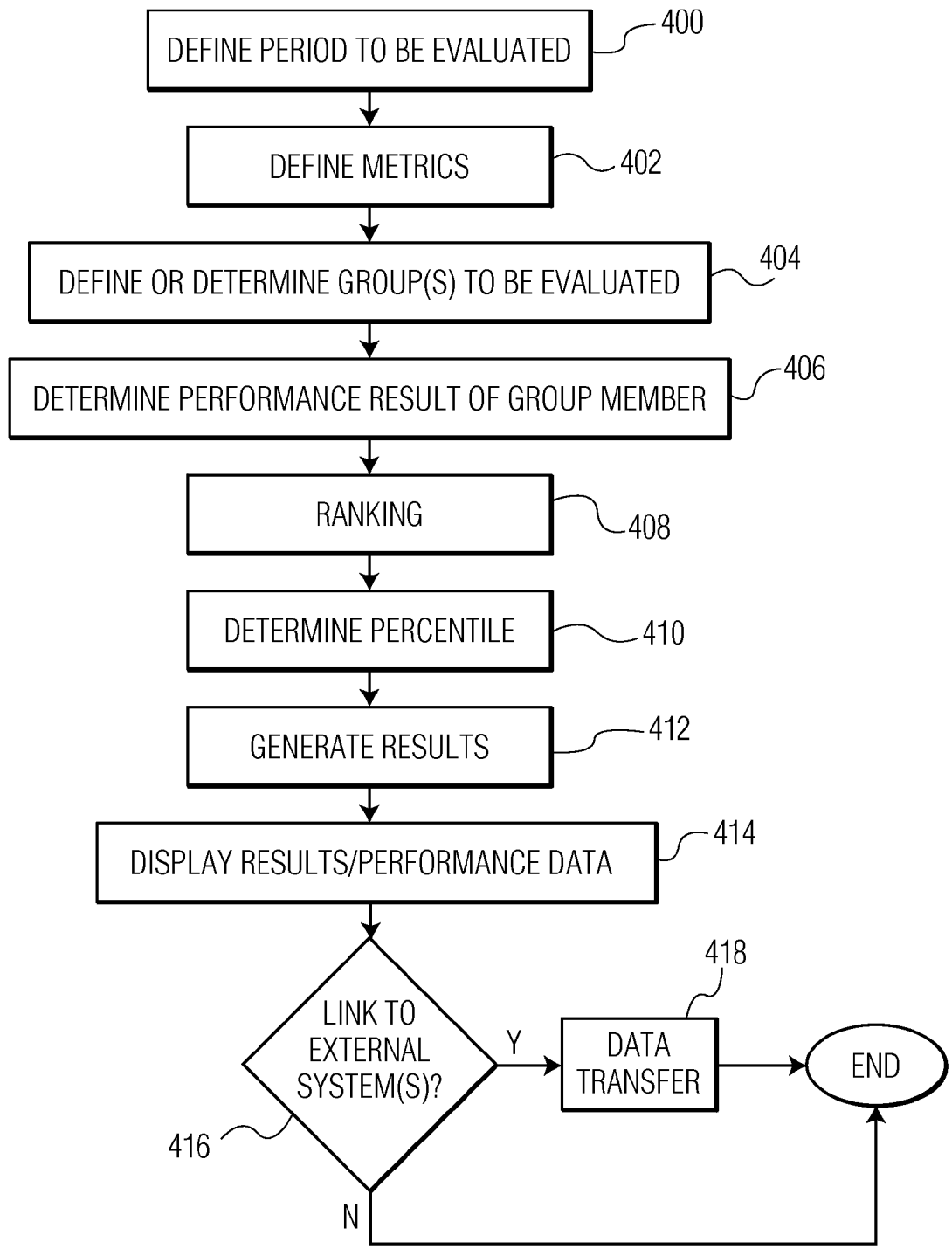
FIG. 4 is a flow chart with a system having an external link capability in accordance with yet another embodiment of the present invention.

FIG. 4 is another flow chart highlighting yet another embodiment of the present invention. With steps 400-412 being similar to steps 200-212 in FIG. 2, the additional feature is the linking and data transfer capabilities as shown in steps 416 and 418. The linking and data transfer is implemented by database server 112 using instruction code resident on the server. The data generated by the present invention may be used for other determinations or analyses by other external systems used in analyzing performance or for conducting other purposes such as conducting a periodic performance review or appraisal. Such systems may be connected to the system envisioned in the present invention in a variety of ways, including, without limitation, intranet, internet, WAN, LAN, network systems and/or the like.

Figure 5A:
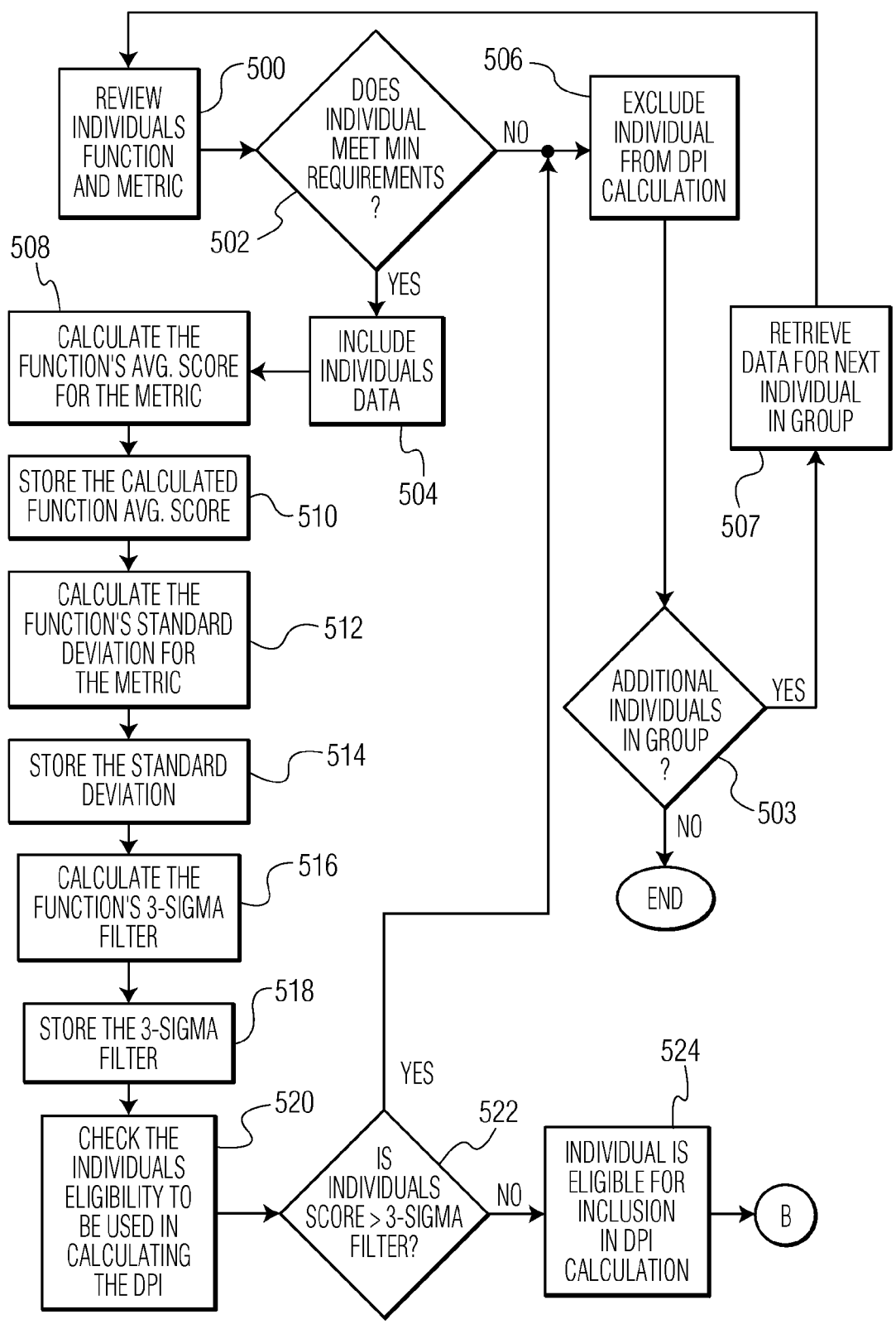
FIGS. 5A and 5B are flow charts showing the generation of a dynamic performance index according to a further embodiment of the present invention.
Figure 5B:
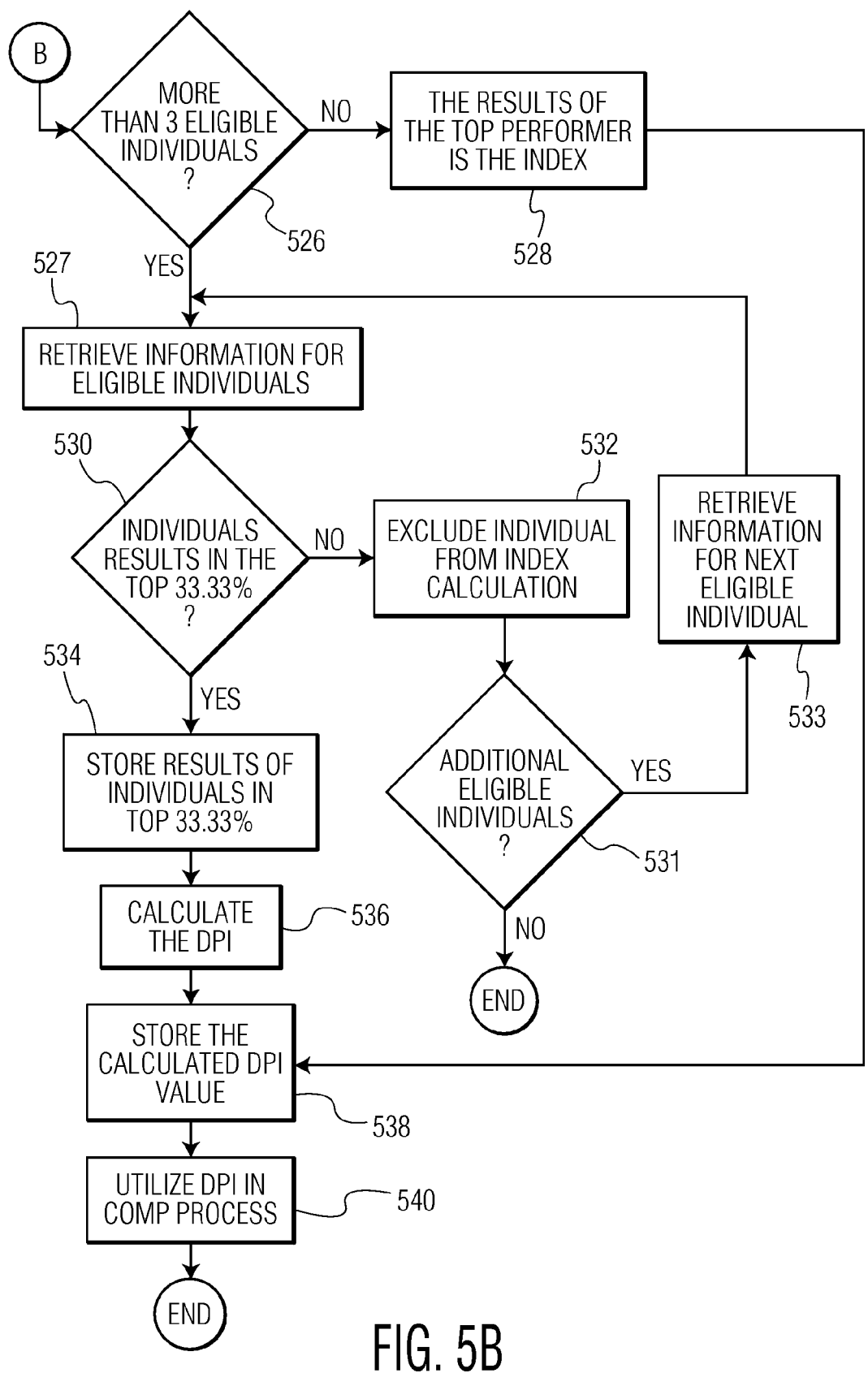

FIGS. 5A and 5B are flow charts illustrating the generation of a dynamic performance index according to an embodiment of the present invention. The dynamic performance index ("DPI") provides goals or benchmarks for individuals within a given or selected group. The DPI addresses the problem of changing impacts—events that affect or impact work flow such as disasters, seasonal events, etc. The DPI also addresses other events such as those that occur within the entity that require a shift in goal-setting for individuals. When changing impacts or events occur, certain overrides are available to change the DPI index in order to evaluate individuals' performance.

In an exemplary embodiment, the DPI is established using the top n-percent of the group of the selected individuals (e.g., where n=the top ⅓ of the group). In another exemplary embodiment, the DPI is set monthly and once the first week of the month is complete, the index is calculated using the top n-percent methodology (e.g., by selecting the top-⅓ performing individuals of the group). Additional data is accumulated each week. After the second week, the DPI is recalculated using data from the first and second weeks. The DPI is then applied to the work performed by the individuals for both weeks in order to create a Credit Quotient ("CQ") as described below. The process continues through each week for the entire month. The DPI is then finalized at the end of the month and applied back to all weeks of performance for the month. It should be understood that references to specific percentages and time periods are exemplary. Other percentages and periods can be used and still be within the scope of the embodiments described herein.

Now referring to FIG. 5A, in step 500, a function and metric to be evaluated for each individual within a select group is reviewed. The function relates to an individual's responsibility and the metric relates to the measurement of the individual's performance with respect to the individual's responsibility/function. For example, a function can be collecting unpaid debts and a metric can be the total amount of debts collected per hour. Other functions and metrics to be evaluated for each individual can be used and still be within the scope of the embodiments described herein. In step 502, a database server 112 determines whether the individual meets the minimum requirement(s) for the particular metric. This determination will be made by comparing predetermined benchmark data previously stored on database server 112 with the individual's performance data. If at step 502 the individual fails to meet the minimum requirement(s), then the individual is excluded from the DPI calculation or generation, as shown at step 506. Database server 112 then determines whether there are additional members of the group (step 503). If there are additional members, database server 112 then retrieves the performance data for the next individual in the group and the process proceeds to step 500. If, however after decision step 502 the individual meets the minimum requirement(s), the individual's performance data for a particular function is included in the calculation of the function average, as shown in step 504. Database server 112 then retrieves the individual's stored performance data from the server's storage component. For instance, when evaluating the performance of operators who take telephonic calls within an entity, the individual's performance data may be the number of calls taken within an hour. The function's average score is then calculated by the processor component of database server 112 in step 508 according to the following formula:

Function Average=Σ(Function's Numerator Components)/Σ(Function's Denominator Components)

Using as an illustration, an individual's function may be the number of calls taken at an entity's call center within an hour. As such, the individual's function numerator will be the number of calls taken while the function denominator will be the number of hours. At step 510, the function average score is then stored in the storage component of database server 112. Next, the function's standard deviation is calculated by the processor component of database server 112 in step 512 in accordance with the following formula:

$$\sigma = \sqrt{\frac{\sum((x-b)^2)}{n}}$$

where σ is the standard deviation;

x is an individual's metrics result/value for the individual's function in a selected period;

b is the mean metric result/value for the selected group of individuals; and n is the total number of individuals in the selected group.

The value of the standard deviation is then stored in the storage component of database server 112 in step 514.

The function's 3-sigma filter is calculated next, as shown in step 516. The 3-sigma filter is the determination of the top performers (e.g., top-⅓ performers) among the group of individuals and is calculated by the processor component of database server 112 using the formula:

3-Sigma Filter=(Avg.+3σ)

where Avg. is the mean average score of an individual's metrics result/value for the individual's function, and σ is the function standard deviation.

After the calculated value of the 3-sigma filter is stored in the storage component of database server 112 in step 518, database server 112 checks whether the individual is eligible to be included in the DPI determination, as shown in step 520. This is done by comparing the individual's metric result with the 3-sigma filter value in step 522. If the individual's score is greater than or equal to the value of the 3-sigma filter, then the individual is excluded from the DPI calculation in step 506. If the individual's score is less than or equal to the 3-sigma filter, the individual's score or function data is used in calculating the index as shown in step 524.

After step 524, the process flow continues in FIG. 5B with the determination of the top performers (e.g., top ⅓ in the embodiment shown, but not limited thereto) among the group of individuals, as shown in step 526. The top performers are determined by the processor and storage components of database server 112 by checking each individual's performance data as stored in the storage component of database server 112 in relation to the number of individuals within the group. The individual will be in the top n-percentile (e.g., top ⅓ as shown, but not limited to this fraction) of the group if, for example:

(Individual's Metric Score Rank in Descending Order {best to worst})/(# of Individuals in Group {after 3-Sigma filtering})≧0.6667

If three or fewer eligible individuals exist, then the results of the top performer among the eligible individuals is selected by database server 112 as the index, as shown in step 528. If a determination is made at step 526 that more than three eligible individuals exist, database server 112 will then retrieve information or data for the eligible individuals (step 527). If an individual is not in the top n-percentile (e.g., top ⅓ of the group as shown, but not limited to this fraction), that individual's function data is excluded from the DPI (index) calculation in step 532. Database server 112 then determines whether there are additional eligible individuals in the group (step 531). If there are additional eligible individuals, database server 112 then retrieves the data for the next eligible individual in step 533 and the process proceeds to step 530. Where, however, the individual is in the top n-percentile (e.g., top ⅓ of the group as shown, but not limited to this fraction), the individual's results, along with those of other individuals in the top n-percentile, are stored in step 534. The DPI is then calculated by using the individuals in the top n-percentile (e.g., top ⅓ of the group) as shown in step 536 using their related data, i.e. function numerator and denominator components, and the following formula:

Σ(Function's Top n-percent Numerator Components)/ Σ(Function's Top n-percent Denominator Components)

where the Function's Top n-percent Numerator Components is, for example, the function's top ⅓ numerator components and Function's Top n-percent Denominator Components is, for example, the function's top ⅓ denominator components. In step 538, the calculated value is then stored in the storage component of database server 112 and, at step 540, utilized in further processes used in evaluating an individual's performance.

In an alternate embodiment, the determination of whether an individual is in a given top percentile of the group may be determined by:

(Individual's Metric Score Rank in Descending Order {best to worst})/(# of Individuals in Group {after 3-Sigma filtering})≧(1−n)

where n is a fraction equal to the percentile. For example, in determining whether an individual is in the top 50%, n will be equal to 0.5.

Figure 6:
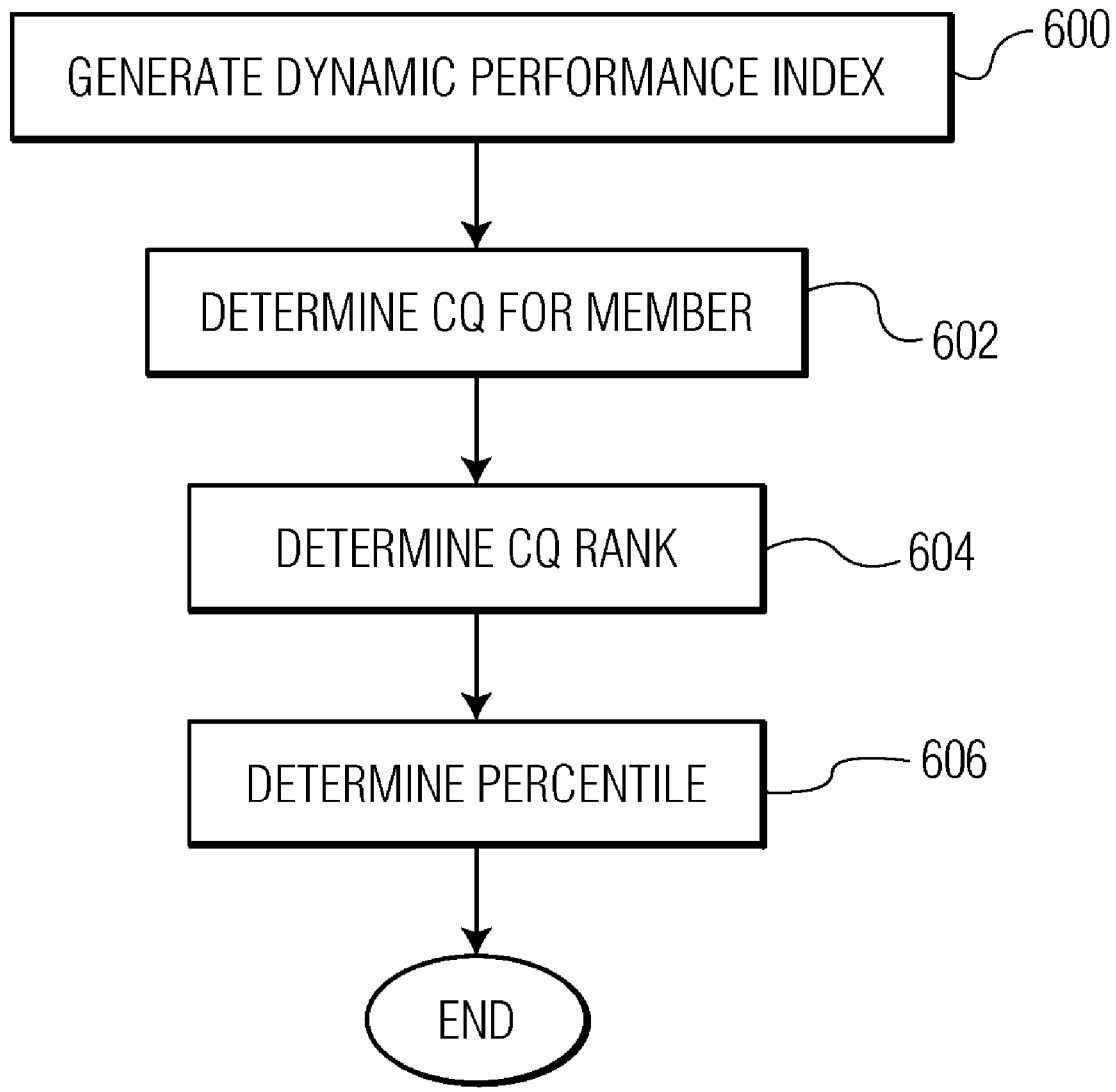
FIG. 6 is a flow chart showing the determination of a credit quotient and percentile process in accordance with yet a further embodiment of the present invention.

FIG. 6 shows a flow chart outlining and explaining the percentile generation process, step 208 in FIG. 2, in more detail. In step 600, the DPI is first generated by the processor component of database server 112. Following the DPI generation, at step 602 a credit quotient (CQ) for each individual is determined. The CQ is a measure of an individual's performance variance versus the DPI. The CQ may be calculated or determined for each metric by the processor component of database server 112 using the formula:

CQ=(Result/DPI)×100 where Result is the performance result value(s) of the individual being evaluated while the DPI is the dynamic performance index for the system at that given point in time. Because CQ's are generated by comparing performance against the DPI, one can compare the CQ's for any metric across different functions. CQs are analyzed over different periods of time including a "Month to Date" and a "Review to Date" period. The "Month to Date" shows an individual's CQ's for a given metric over the month while the "Review to Date" indicates the individual's up-to-date CQ measured over the period.

Following the determination of the member's CQ, the individual's CQ rank is determined in step 604. A stack rank of the CQ is then performed for each individual in the individual's group and metric (not shown). This metric stack rank will generate a metric percentile. As an illustration, one would create a stack rank for each individual within a group that has a particular metric and compare CQ's for all individuals. Based on the individual's standing in the stack rank, the individual will receive a percentile for that particular metric. The metric percentiles are then combined based on weighting to calculate a combined overall percentile. This percentile will be stack ranked to determine the official overall percentile. Next, the CQ percentile is determined, as shown in step 606. This percentile is calculated by the formula:

Percentile=(CQ Rank/Population)

where CQ Rank is the credit quotient rank as determined above and Population is the number of members within the defined group.

Figure 7:
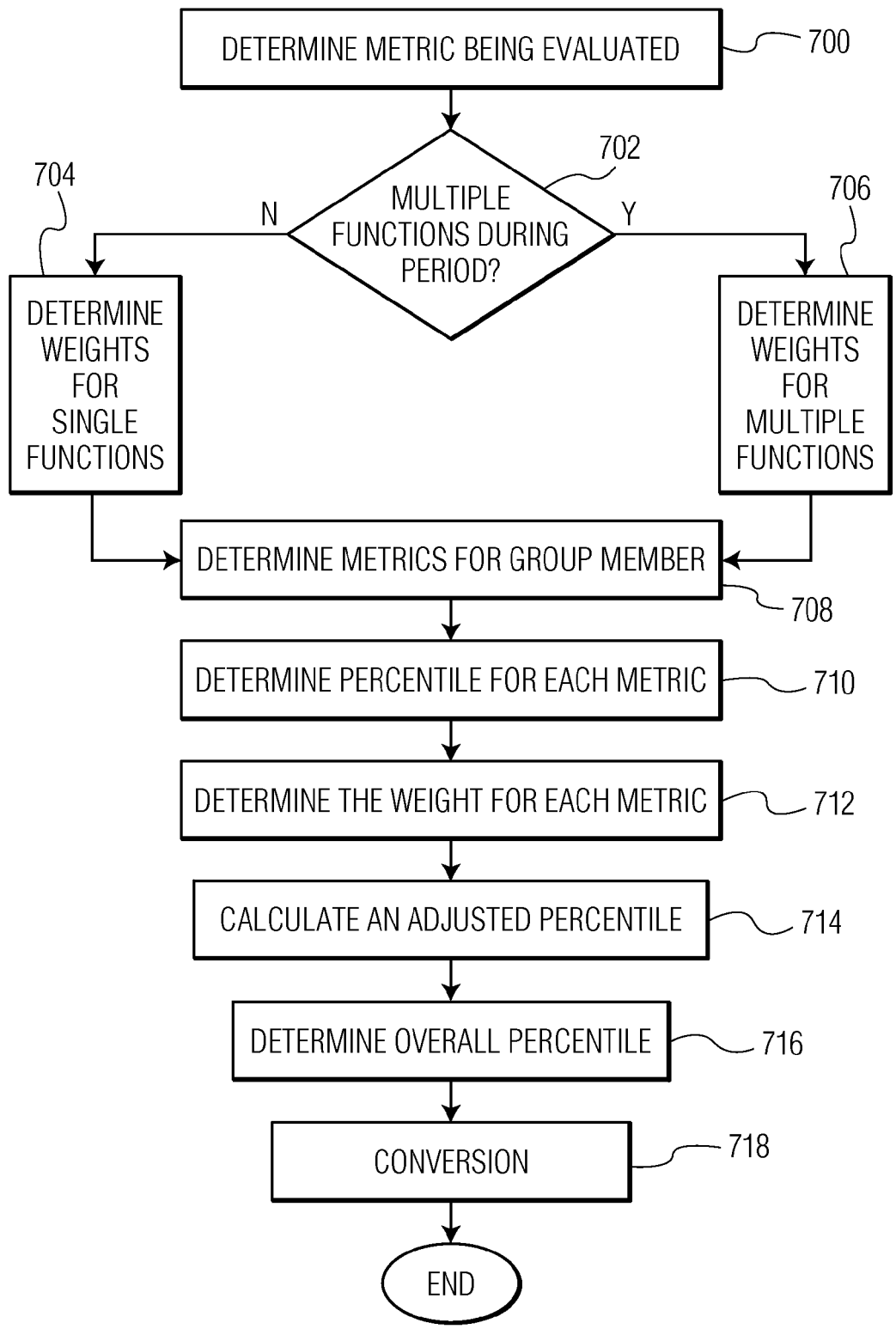
FIG. 7 is a flow chart highlighting a ranking process according to another embodiment of the present invention.

FIG. 7 is a flow chart outlining and explaining an overall ranking process according to the present invention. In step 700, the metric evaluated is determined. Next, because individuals may have different functions or responsibilities during the evaluated period, database server 112 checks whether the individual had multiple functions during the period, as shown in step 702. If a determination is made at step 702 that the individual did not have multiple functions during the period, then at step 704, the weights for the single function are determined. Otherwise, at step 706 weights for multiple functions are determined. This is to ensure that appropriate weights are determined and applied to the individual's metric at step 708. These predetermined weights are entered and stored on database server 112 for each metric by the authorized user. The individual's percentile, as previously calculated in step 606 of FIG. 6, is determined and retrieved from database server 112 next at step 710. The applicable weight for each metric being evaluated is determined (step 712) and then the adjusted percentile is calculated in step 714. This is obtained by multiplying the applicable weight with the CQ percentile. Thus, the adjusted percentile is calculated by:

Adjusted Percentile=(Applicable Metric Weight×CQ Percentile) where,

Applicable Metric Weight is the weight assigned for each metric and previously stored in the storage component of database server 112 and CQ Percentile is the given by dividing the CQ Rank divided by the size or population of the individual's group being evaluated.

Next, the Overall Percentile is calculated at step 716 by adding all of the Adjusted Percentiles for each metric evaluated:

Weighted Percentile=Σ(Adjusted Percentiles)

Once the weighted percentile is calculated, the individual's percentile can be restacked (not shown) against those of other individuals within the same group being evaluated. Finally, the overall percentile is converted to a rating for each individual based on a predetermined rating system, as shown at step 718. In one embodiment of the present invention, this rating system may depend on the entity's overall performance for a given period. For instance, for a rating system with a scale of 1-5, all individuals in the top 20% may be assigned a rating of "1" for excellent performance; next 20% a rating of "2", and so on.

Figure 8A:
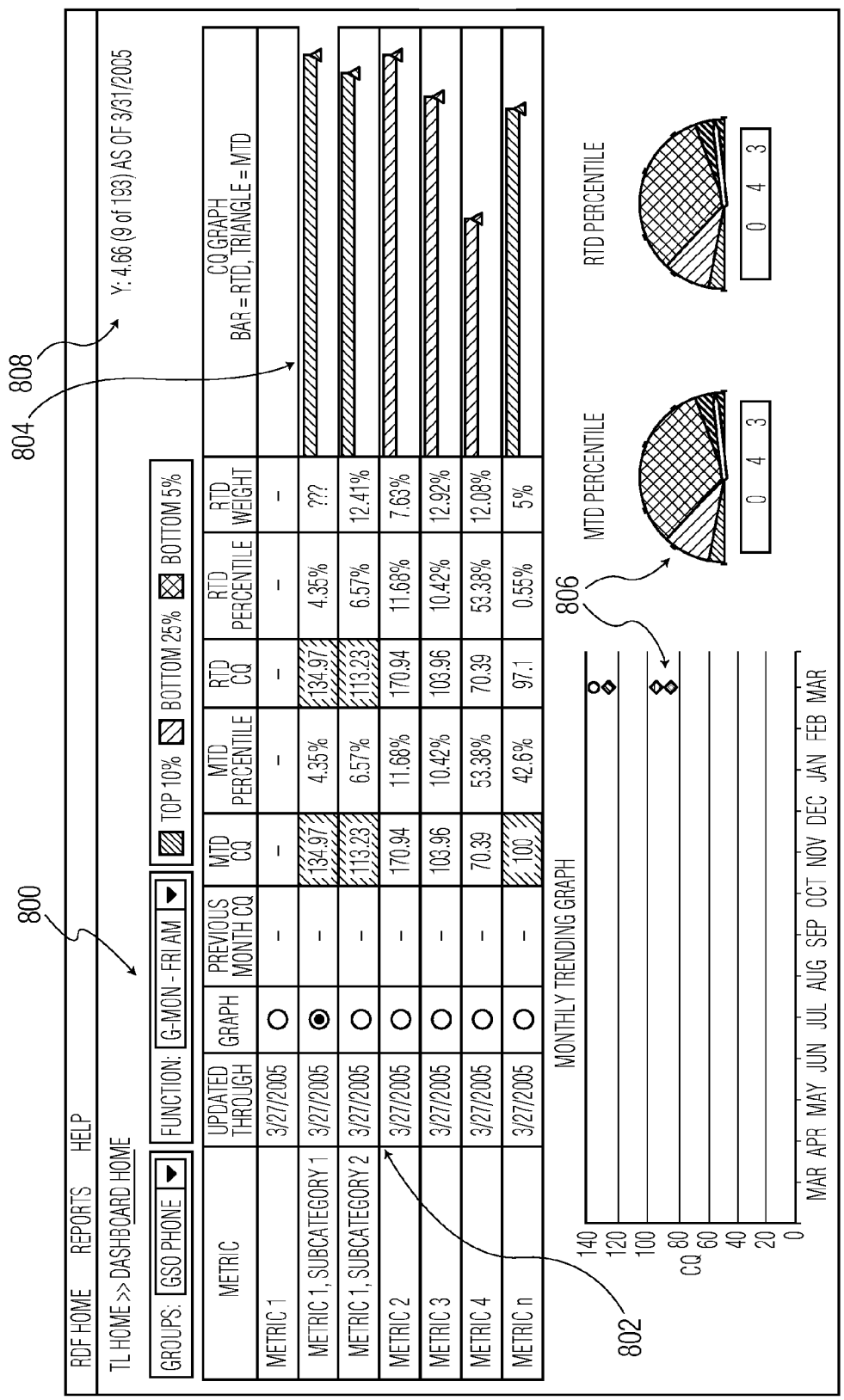
FIG. 8A shows an overall display of results or reports generated by the present invention in accordance with yet another embodiment of the present invention.

FIG. 8A shows an exemplary display of results/reports generated in accordance with an embodiment of the present invention. The display includes: a menu section, 800 which includes links to other websites and provides navigation options and function filters; data section, 802 which lists all metrics the individual is responsible for and is arranged by different time periods; CQ graph, 804 which visually shows users how their "Review to Date" and "Month to Date" CQ's compare; monthly trending graphs, 806, generated on any metric shown in the data section, 802 and which show a user how they are performing on a "Month to Date" or "Review to Date" basis; summary section, 808 which shows the user their overall rank and percentile in the group across all metrics.

Figure 8B:
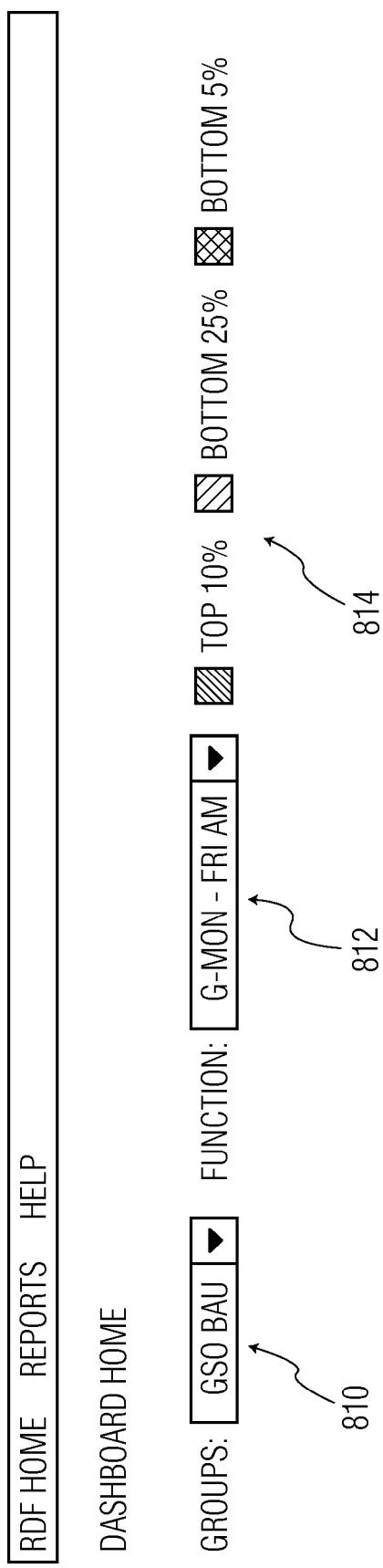
FIG. 8B shows the link section of the overall results or reports display of FIG. 8A in further detail in accordance with a further embodiment of the present invention.

FIGS. 8B through 8F show the display sections of FIG. 8A in further detail and in accordance with an embodiment of the present invention. In FIG. 8B, links to other websites or groups are found in link section 810. Pulldown bar 812 indicates the period over which the performance review is conducted and allows a user to filter the data section by function. For instance, if an individual worked in more than one function during the year, a user will be able to select the data for each function. Alternatively, the user will be able to select the data across all functions for the individual. The menu section further comprises a legend 814, which explains what each highlights mean throughout the system. For instance, certain highlights may be used to designate individual performance e.g. to indicate that an individual or group of individuals are in the top 10%, bottom 25% or bottom 5% of the group. The highlights may be represented by colors, hatch marks or any other visually distinguishing way. In FIGS. 8A-8E, the hatch marks are used to represent colors.

FIG. 8C shows the data section 802 of FIG. 8A in further detail and in accordance with an embodiment of the present invention. Section 820 lists the name of each metric. Metrics that carry a weight in an individual's review are displayed in bold. The metric section may also contain further drilldown paths 820a, 820b, which show a collection of directional metrics that help drive the performance review.

Section 821 indicates how up-to-date the data displayed is. Section 822 provides a user with the ability to see a trending graph for any of the metrics listed in section 820. Section 823 provides the user with the individual's CQ values for the previous month. Section 824 displays the current month-to-date CQ based on the most recent date displayed. Section 825 shows the percentile the individual's month-to-date CQ ranks in each metric. Section 826 displays the review-to-date CQ based on the most recent date displayed. Section 827 displays what percentile an individual's review-to-date CQ ranks in each metric. Section 828 displays how much weight each metric carries in an individual's performance review.

Figure 8D:
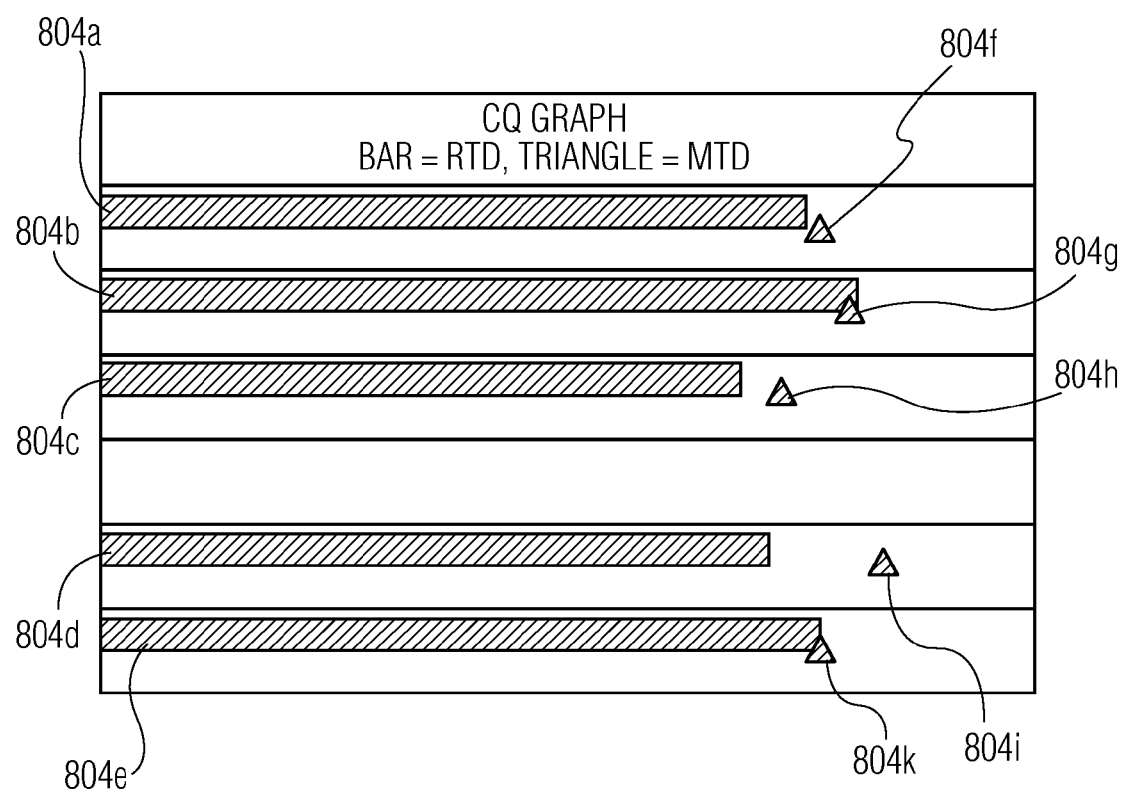
FIG. 8D shows the credit quotient graph section of the overall results or reports display of FIG. 8A in further detail in accordance with an embodiment of the present invention.

FIG. 8D shows the CQ Graph section 804 of FIG. 8A in further detail and in accordance with an embodiment of the present invention. The CQ graph provides a user with a visual display of an individual's month-to-date CQ. It also shows how the individual's CQ is trending. The CQ graph comprises of bars 804a-804e, which represent the individual's review-to-date CQ values. Triangles or other similar markers, 804f-804k represent the individual's month-to-date CQ. The bars and triangles may be displayed in highlighted colors (shown as hatch marks), in accordance with legend 814, to indicate the individual's performance with respect to the individual's group e.g. bottom 25% or bottom 5%.

Figure 8E:
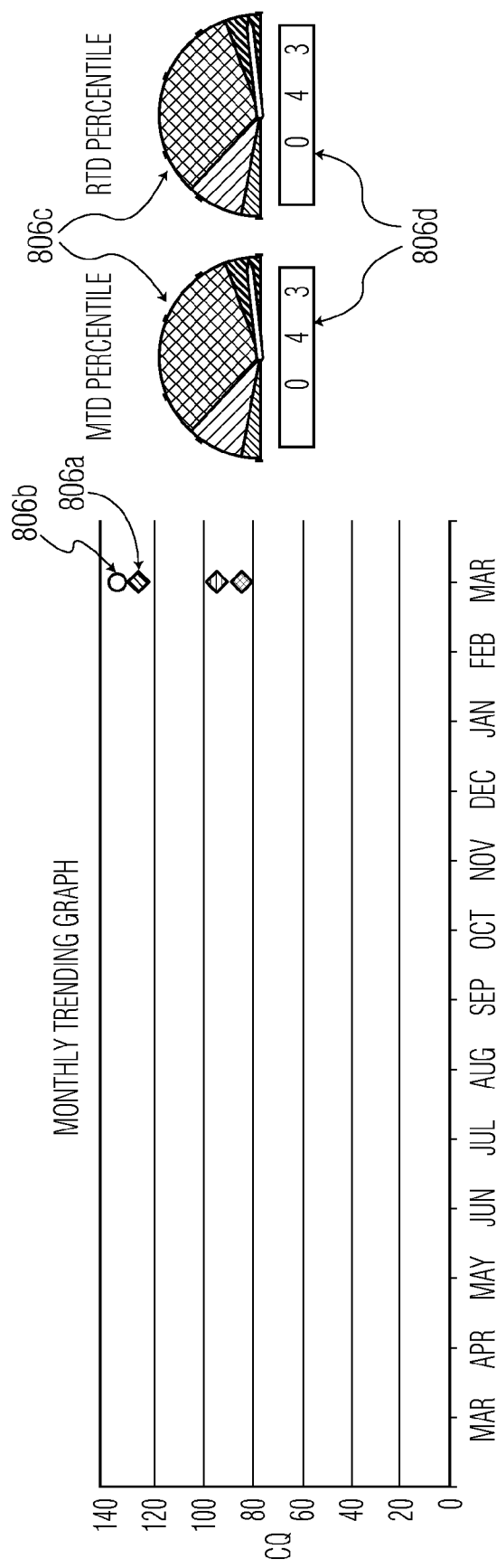
FIG. 8E shows the trending graph section of the overall results or reports display of FIG. 8A in further detail in accordance with another embodiment of the present invention.

FIG. 8E shows the trending graph section 806 of FIG. 8A in further detail and in accordance with an embodiment of the present invention. The trending portion is a visual representation of the data section. The trending section comprises of a monthly trending graph of the CQ for any of the metrics. Month-to-date and review-to-date "speedometer" graphs 806c represent the percentile for the chosen metric. Diamond 806a is used to indicate where the different rankings fell e.g., where the top 10%, bottom 25% or bottom 5% fell. "Speedometer" graphs 806c show the different rankings for the group by color shades (shown as hatch marks) in accordance with legend 814. Each graph shows the individual's percentile in section 806d.

FIG. 8F shows the summary section 808 of FIG. 8A in further detail and in accordance with an embodiment of the present invention. Section 808a displays the individual's overall percentile, which is a composite of each of the individual's metric percentiles multiplied by the weighting for each metric. Section 808b displays the individual's performance rank with the first number being the individual's rank and the second number the number of individuals in the population or selected group. Section 808c displays a date, which indicates how up-to-date the summary is.

It is noted that the system and process envisioned in the present invention may be implemented on a local computer configured to perform the tasks, processes and functions herein without need for such components as network 108, web server 110 and database server 112.

Although this present invention has been disclosed with reference to specific forms and embodiments, it will be evident that a great number of variations may be made without departing from the spirit and scope of the present invention. For example, parts or steps may be reversed, equivalent elements may be substituted for those specifically disclosed, and certain features of the present invention may be used independently of other features all without departing from the present invention as defined in the appended claims.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method of evaluating performance over a network, comprising:
using a processor to perform the following steps:
defining a period to evaluate;
defining at least one performance indicator;
defining at least one group to be evaluated, wherein each group comprises at least one member;
determining a performance result for at least one performance indicator for the at least one member;
rating the at least one member;
determining the percentile of the performance result, by:
generating a performance index for the at least one performance indicator,
generating a credit quotient for the at least one member,
determining a credit quotient rank for the at least one member, and
determining a percentile for the at least one member; and
generating one or more reports.

2. The method according to claim 1, further comprising the step of:
defining the percentile of the at least one member of the group based on a given period.

3. The method according to claim 2, further comprising the step of:
applying one or more weighting factors to the period-based percentile.

4. The method according to claim 1, further comprising the step of:
rating the at least one member based on the overall performance of the group members' entity.

5. The method according to claim 1, further comprising the step of:
linking with at least one external system or database.

6. The method according to claim 5, further comprising the step of:
providing information or data to the at least one external system.

7. The method according to claim 1, wherein the rating step comprises the steps of:
determining whether the at least one member had more than one function during the given period;
determining the performance indicators for the at least one member;
determining the percentile for the at least one member;
determining the appropriate weights to apply;
calculating at least one adjusted percentile;
determining an overall rank based on the overall percentile; and
determining an overall percentile.

8. The method according to claim 7, wherein the step of calculating the at least one adjusted percentile comprises the step of multiplying each performance indicator by a weight determined for each performance indicator.

9. The method according to claim 7, wherein the step of determining the overall percentile comprises of the step of adding all of the adjusted percentiles.

10. A system for analyzing performance within an entity, comprising:
a memory device; and
a processor, the processor configured to:
define a period to evaluate;
define at least one performance indicator;
define at least one group to be evaluated, wherein each group comprises at least one member;
determine performance result for at least one performance indicator for the at least one member;
rank the at least one member;
determine the percentile for the performance by the at least one member based on the at least one performance indicator; and
generate a performance index for the at least one performance indicator;
generating a credit quotient for the at least one member;
determine a credit quotient rank for the at least one member;
determine a percentile for the performance by the at least one member; and
generate one or more reports.

11. The system according to claim 10, wherein the processor is further configured to define the percentile of the at least one member based on a given period.

12. The system according to claim 11, wherein the processor is further configured to apply weights to the period-based percentile.

13. The system according to claim 10, wherein the processor is further configured to additionally rank the group members based on the overall performance of the group's entity.

14. The method according to claim 1, further comprising the step of:
displaying the credit quotient rank.

15. The method according to claim 1, wherein the step of generating the credit quotient comprises calculating the formula:

(Result/DPI)×100 where Result is the performance result by the at least one member for a given performance indicator or metric and the DPI is a system generated index based on data collected periodically.

16. The method according to claim 1, wherein the step of determining the percentile comprises calculating the formula:

(Rank/Population)×100 where Rank is the credit quotient rank for the at least one member and Population is the number of members within the group.

17. The system according to claim 10, wherein the processor is further configured to link with at least one external system or database.

18. The system according to claim 17, wherein the processor is further configured to provide information or data to the at least one external system.

19. The system according to claim 10, wherein the processor is further configured to display the credit quotient rank.

20. The system according to claim 10, wherein the processor is further configured to determine the credit quotient by calculating the formula:

(Result/DPI)×100 where Result is the performance result by the at least one member of the group for a given performance indicator or metric and the DPI is a system generated index based on data collected periodically.

21. The system according to claim 10 wherein the processor is further configured to determine the percentile by calculating the formula:

(Rank/Population)×100 where Rank is the credit quotient rank for the at least one member of the group and Population is the number of members within the group.

22. The system according to claim 10, wherein the processor is further configured to:
- determine whether the at least one member had more than one function during the given period;
- determine the performance indicators for the at least one member;
- determine the appropriate weights to apply;
- determine the percentile for the performance by the at least one member;
- calculate at least one adjusted percentile;
- determine an overall rank; and
- determine an overall percentile.

23. The system according to claim 22, wherein the processor is further configured to multiply each performance indicator by a predetermined weight for each performance indicator.

24. The system according to claim 22, wherein the processor is further configured to add all of the at least one adjusted percentile.

25. A computer readable medium comprising:
- instruction code for defining a period to evaluate;
- instruction code for defining at least one performance indicator;
- instruction code for defining at least one group to be evaluated, wherein each group comprises of at least one member;
- instruction code for determining performance result for at least one performance indicator for at least one member;
- instruction code for determining the percentile for the performance by at least one member based on the at least one performance indicator;
- instruction code for rating the at least one member;
- instruction code for generating a performance index for the at least one performance indicator;
- instruction code for generating a credit quotient for the at least one member;
- instruction code for determining a credit quotient rank for the at least one member;
- instruction code for determining a percentile for the performance by the at least one member; and
- instruction code for generating one or more reports.

26. The computer readable medium according to claim 25, further comprising instruction code for defining the percentile of the at least one member based on a given period.

27. The computer readable medium according to claim 26, further comprising instruction code for applying weights to the period-based percentile.

28. The computer readable medium according to claim 25, further comprising instruction code for additionally rating the group members based on the overall performance of the group's entity.

29. The computer readable medium according to claim 25, further comprising instruction code for linking with at least one external system or database.

30. The computer readable medium according to claim 29, further comprising instruction code for providing information or data to the at least one external system.

31. The computer readable medium according to claim 25, further comprising instruction code for displaying the credit quotient rank.

32. The computer readable medium according to claim 25, further comprising instruction code for calculating the formula:

$$(Result/DPI) \times 100$$

where Result is the performance result by the at least one member for a given performance indicator or metric and the DPI is a system generated index based on data collected periodically.

33. The computer readable medium according to claim 25, further comprising instruction code for calculating the formula:

$$(Rank/Population) \times 100$$

where Rank is the credit quotient rank for the at least one member and Population is the number of members within the group.

34. The computer readable medium according to claim 25, further comprising instruction code for:
- determining whether the at least one member had more than one function during the given period;
- determining the performance indicators for the at least one member;
- determining the appropriate weights to apply;
- determining the percentile for the performance by the at least one member;
- calculating at least one adjusted percentile;
- determining an overall percentile; and
- determining an overall rank based on the overall percentile.

35. The computer readable medium according to claim 34, further comprising instruction code for multiplying each performance indicator by a predetermined weight for each performance indicator.

36. The computer readable medium according to claim 34, further comprising instruction code for adding all of the at least one adjusted percentile.

* * * * *

UNITED STATES PATENT AND TRADEMARK OFFICE
CERTIFICATE OF CORRECTION

| | | |
|---|---|---|
| PATENT NO. | : 7,565,268 B2 | |
| APPLICATION NO. | : 11/617334 | |
| DATED | : July 21, 2009 | |
| INVENTOR(S) | : Chad W. Smith et al. | |

It is certified that error appears in the above-identified patent and that said Letters Patent is hereby corrected as shown below:

SHEET 5:

Fig. 5A, "INDIVIDUALS" (at 500, 504, 520 and 522) should read --INDIVIDUAL'S--.

SHEET 6:

Fig. 5B, "INDIVIDUALS" (at 530) should read --INDIVIDUAL'S--.

COLUMN 3:

Line 61, "comprise of" should read --comprise--.

COLUMN 4:

Line 36, "terms an" should read --terms of an--.

COLUMN 8:

Line 67, "where," should be deleted.

COLUMN 9:

Line 1, "Applicable" should read --where Applicable--;
    Line 3, "the given" should read --given--;
    Line 46, "highlights mean" should read --highlight means--;
    Line 47, "performance" should read --performance,--; and
    Line 48, "e.g." should read --e.g.,--.

COLUMN 10:

Line 10, "of" should be deleted;
    Line 16, "group e.g." should read --group, e.g.,--;
    Line 21, "comprises of" should read --comprises--; and
    Line 25, "fell e.g.," should read --fell, e.g.,--.

COLUMN 11:

Line 58, "comprises of" should read --comprises--.

UNITED STATES PATENT AND TRADEMARK OFFICE
CERTIFICATE OF CORRECTION

PATENT NO.         : 7,565,268 B2
APPLICATION NO. : 11/617334
DATED              : July 21, 2009
INVENTOR(S)       : Chad W. Smith et al.

It is certified that error appears in the above-identified patent and that said Letters Patent is hereby corrected as shown below:

COLUMN 12:

Line 9, "generating" should read --generate--; and
Line 60, "claim 10 wherein" should read --claim 10, wherein--.

COLUMN 13:

Line 26, "comprises of" should read --comprises--.

Signed and Sealed this

Twenty-fourth Day of November, 2009

David J. Kappos
*Director of the United States Patent and Trademark Office*